United States Patent [19]

Oelsch et al.

[11] 4,442,055
[45] Apr. 10, 1984

[54] PROCESS FOR THE MANUFACTURE OF A CONTACT MAT

[75] Inventors: Jürgen Oelsch, Salz; Richard Volk, Brendlorenzen; Karl-Heinz Claassen, Wülfershausen, all of Fed. Rep. of Germany

[73] Assignee: Preh Elektrofeinmechanische Werke Jakob Preh Nachf. GmbH & Co., Bad Neustadt, Fed. Rep. of Germany

[21] Appl. No.: 425,520

[22] Filed: Sep. 28, 1982

[30] Foreign Application Priority Data

Nov. 6, 1981 [DE] Fed. Rep. of Germany ....... 3144084

[51] Int. Cl.³ ............................................. B29H 3/08
[52] U.S. Cl. ................................... 264/105; 264/250; 264/255; 264/294; 264/327; 264/328.2; 264/328.7; 264/328.13
[58] Field of Search ........................ 264/105, 245–247, 264/250, 255, 294, 327, 328.2, 328.8, 328.7, 328.13

[56] References Cited

FOREIGN PATENT DOCUMENTS 2418583 11/1974 Fed. Rep. of Germany .
2902892  8/1979 Fed. Rep. of Germany .
2822033 11/1979 Fed. Rep. of Germany .
3029515  2/1981 Fed. Rep. of Germany .

*Primary Examiner*—Thomas P. Pavelko
*Attorney, Agent, or Firm*—Woodcock, Washburn, Kurtz, Mackiewicz & Norris

[57] ABSTRACT

A process for the manufacture of a contact mat suitable for a keyboard or keypad is described. This contact mat is produced by the injection-moulding process and consists of a sheet-like composite body made of an electrically non-conductive two-component silicone rubber, and at least one carrier part, which is elastically deformable when pressure is applied to a key and is moulded out in the shape of a calotte. On the inside of the carrier part and in the pole region, there is a contact component which is made of an electrically highly conductive material. When the carrier part is depressed, an electrical connection is made via the contact component between the contact surfaces of a printed circuit located below the contact mat. In order to be able to manufacture the contact component in a simple manner and without waste, the contact component is made in an injection mould, wherein the entire lower mould part is at a temperature above the vulcanization temperature of the contact component. The upper cavity plate of the corresponding upper mould part consists of two halves of which one half is at a temperature below the vulcanization temperature. The contact component is produced by means of this half. Subsequently, a lower cavity plate of the lower mould part is rotated from this first into a second position, and the composite body and the carrier body are then moulded. This half of the upper cavity plate is at a temperature above the vulcanization temperature. Accordingly, all the curable components are vulcanized separately, even though they are moulded in the same mould.

7 Claims, 7 Drawing Figures

PROCESS FOR THE MANUFACTURE OF A CONTACT MAT

FIELD OF THE INVENTION

The invention relates to a process for the manufacture of a contact mat, for a keyboard or keypad.

BACKGROUND OF THE INVENTION

Due to the general trend from analogue techniques to digital techniques and from hardware to software, press key switches, combined individually or in keyboards, are increasingly used in electrical engineering equipment, communications engineering equipment and, last but not least, in so-called terminals or data input devices. There are a large number of different designs and functional principles for keyboards of this type, which represent the interface between man and machine. The nature of the travel is very important for reliability and also for man—keyboard contact. In addition to the so-called flat or membrane keyboards with a travel of up to about 1.5 mm, there are also, depending on the field of application, keyboards with a travel of between 1.5 and 6.35 mm. In addition, keyboards with touch switches are of course also used. All keyboards with travel have in common, however, that the operating person should, by the sense of touch, obtain a kind of feedback, confirming that the particular key has been actuated.

German Offenlegungsschrift No. 2,418,583 a keyboard in which snap elements, which consist of a rubber-elastic material having the shape of a table mountain, are arranged above a printed circuit board provided with tracks. The section located above the contact points of the printed circuit board is joined to the remaining part by a wall which can be folded or tilted. The design of the wall is such that its thickness gradually decreases from an upper section towards a middle section and gradually increases from the middle section to a lower section having a curved surface which is inclined inwards into the interior of the snap element and extends from the middle section to the upper section. A restoring force is thus obtained by deformation of the wall, the operating person feeling a kind of snapping effect.

So-called switch mats of non-conductive silicone rubber are also known for keyboards: these have a rubber of cupola-shaped raised portions. One contact element of conductive silicone rubber, interacting with contact surfaces of a printed circuit board, is arranged in the hollow interior of each such raised portion. A switch mat of this type is known, for example, from German Offenlegungsschrift No. 3,029,515. Stationary contacts are arranged on a dimensionally stable, electrically insulating base plate. The actual switch mat with a sheet-like composite body and the cupola-shaped raised portions are located above this base plate. The switch mat itself is produced by compression-moulding, vacuum-forming or injection-moulding from a silicone rubber mixture which consists of a silicone rubber and a crosslinking agent. The contact element is produced from a commercially available electrically conductive silicone rubber composition and is joined by vulcanisation to the inner wall of a raised portion. Alternatively, the contact element can be moulded from an electrically conductive plastic, or it can be produced by printing, transferring or coating an electrically conductive composition onto the carrier body.

A further switch mat and process for its manufacture are described in German Offenlegungsschrift No. 2,902,892. Initially, the contact elements are applied to a carrier. In doing this, a uniform layer of an uncrosslinked, electrically conductive elastomer mixture is applied to the carrier. Under the action of pressure and heat, this layer is deformed in a mould to give the desired structure of the contact elements, complete or partial crosslinking taking place. The mould has narrow upright edges which correspond to the contact element. The contour rims on the mould and the carrier mate such that when the mould is closed the elastomer material is forced out between the surface of the carrier and the end faces of the contour ridges or upright edges of the mould. After the mould has been opened, only the contact elements remain on the carrier. On top of this, an electrically insulating uncrosslinked elastomer mixture which is intended to form the composite body is then applied. Subsequently, cross-linking is carried out under pressure and with the action of heat. If the same elastomer is used as the base material for the contact elements and for the composite body, they can both be joined to one another without an adhesion-promoter to give a unitary body. If different base materials are employed, the use of an adhesion-promoter or of an adhesive is necessary. In a final step, the carrier is removed from the switch mat.

Another process for the manufacture of a switch mat is known from German Offenlegungsschrift No. 2,822,033. A ribbon of electrically conductive silicone rubber is drawn through a suitable gap in an injection mould, and the contact elements are punched out of the ribbon by means of a punch and are each moved to a mould cavity. Subsequently, non-conductive silicone rubber is injected via an injection runner into the heated mould. After full vulcanisation, a firm joint between the contact element and the composite body is produced. After the mould halves have been opened, the finished switch mat is ejected by means of compressed air.

All of the above described processes involve undue complexity and waste.

OBJECT OF THE INVENTION

It is the object of the present invention to provide a process for the manufacture of a contact mat for a press keyboard or keypad whereby the contact elements can be manufactured in a simple manner, without waste.

SUMMARY OF THE INVENTION

The present invention satisfies the need of the art and the object of the invention mentioned above by providing a two part process for the formation of a keypad. The process uses a single injection moulding apparatus operated in two halves having different temperatures so that the contact part can be formed of a rubber having a different vulcanizing temperature than the carrier component. In a first step, the contact part is moulded of a conductive silicone rubber in a first portion of the mould and then the mould is rotated with respect to the mating mould and the carrier rubber material is injected.

BRIEF DESCRIPTION OF THE DRAWINGS

The invention is described below in more detail, for one illustrative embodiment, by reference to the drawings in which.

DESCRIPTION OF THE PREFERRED EMBODIMENTS

Figure 1:
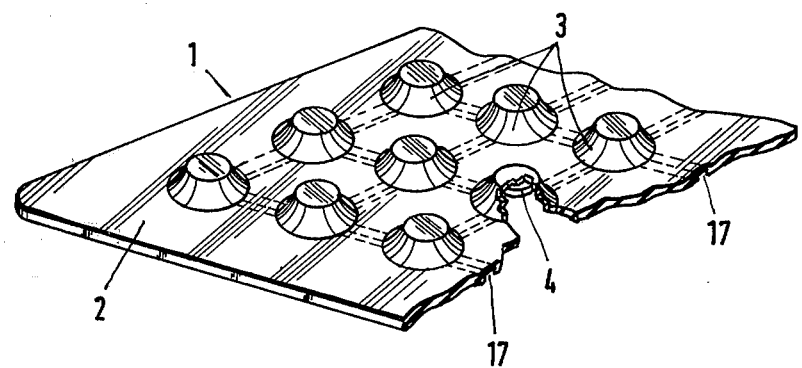
FIG. 1 shows a perspective view of a contact mat, partially in section.

The contact mat marked 1 in FIG. 1 is part of a press keyboard or keypad which would typically additionally comprise a printed circuit board and actuating buttons. The contact mat 1 itself consists of a sheet-like, relatively thin composite body 2 which is made of an electrically non-conductive silicone rubber. Wherever actuating buttons are envisaged, carrier parts 3 projecting out of the plane of the composite body to one side are present in the composite body 2. These carrier parts 3 are designed in the shape of a calotte, i.e., are generally cup-shaped, and can be elastically deformed. On the inside of the carrier part, in the pole region, there is a contact component 4 which is made of an electrically highly conductive material. If the carrier part is then depressed, for example by the actuating button or a finger, an electrical connection between the contact surfaces of a printed circuit is made via the contact component. When the pressure is released, the carrier part snaps automatically back into its original position. Since the contact mat rests flat on the printed circuit, a major part of the air present must escape in some way when the key is pressed. Automatic snapping-back would, however, then no longer occur, since this would cause a vacuum in the cavity. In order to enable the escape of air when a key is pressed, pressure balance channels 17 which extend in a network on the underside of the composite body 2 are provided between the individual carrier parts.

As mentioned above, the contact mat is produced from a silicone rubber, and specifically a so-called HTV silicone rubber (HTV=high-temperature crosslinking-/vulcanising) of plastic consistency is used. By crosslinking (vulcanisation), the plastic silicone rubber is converted into elastic silicone rubber, and the moulded shape is thus fixed. In contrast to RTV silicone rubbers (RTV=room-temperature vulcanizing), the crosslinking takes place under the action of heat and is effected either by means of organic peroxides or special vulcanisation catalysts. There are thus two industrially important possible vulcanisation methods which differ in principle, above all with respect to the course of the vulcanisation. Conventional vulcanisation is effected by the organic peroxides already mentioned which, under the action of heat, are split with the formation of free radicals. Only the free radicals initiate the vulcanisation reaction, in the course of which they are converted into other organic compounds which can be removed from the vulcanised products by annealing, which normally follows the vulcanisation. In addition to the silicone rubbers crosslinked by peroxides, there are the types crosslinked by addition reactions. The superficial characteristic of these types is that they are supplied in two separate components which contain reactive groups (alkenyl groups or SiH groups). One component additionally contains a specific catalyst which can be readily poisoned by, inter alia, sulphur, phosphorus and nitrogen compounds and thus loses its activity. For completeness, it should also be mentioned that condensation-crosslinking systems also exist in addition to the systems crosslinking by peroxides or by addition. In principle all the HTV silicone rubbers are infinitely miscible with one another but, for obvious reasons, types crosslinking by peroxides should not be blended with types crosslinking by addition. This is of particular importance whenever—as is customary—the contact component as well as the composite body and the carrier part are also produced from a silicone rubber, to which electrically conductive particles, for example in the form of carbon or metal particles are additionally admixed.

Figure 2:
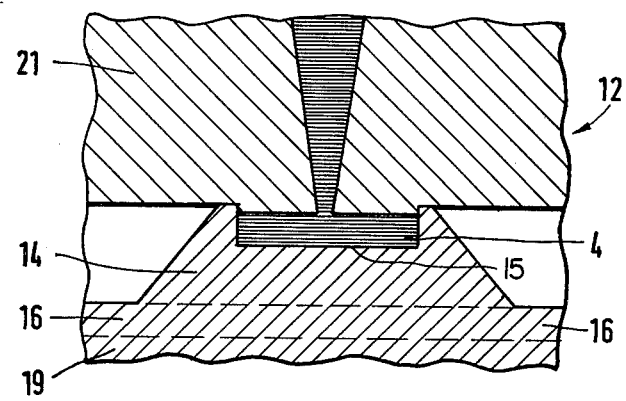
FIG. 2 shows a part view of the injection mould, in section, at the moment of the injection-moulding of the contact element.
Figure 3:
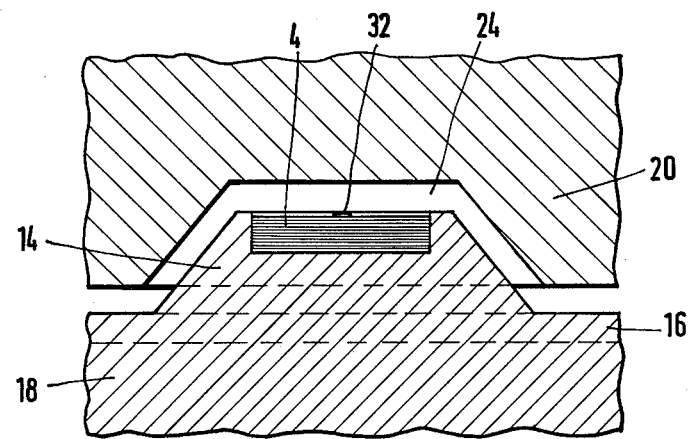
FIG. 3 shows the same part view of the injection mould, in section, before the injection-moulding of the carrier part and the composite body.
Figure 4:
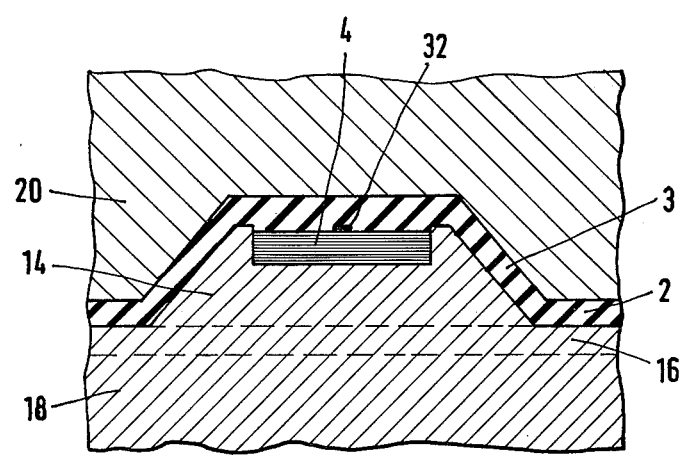
FIG. 4 shows the same part view of the injection mould, in section, after the injection-moulding of the carrier part and the composite body.
Figure 5:
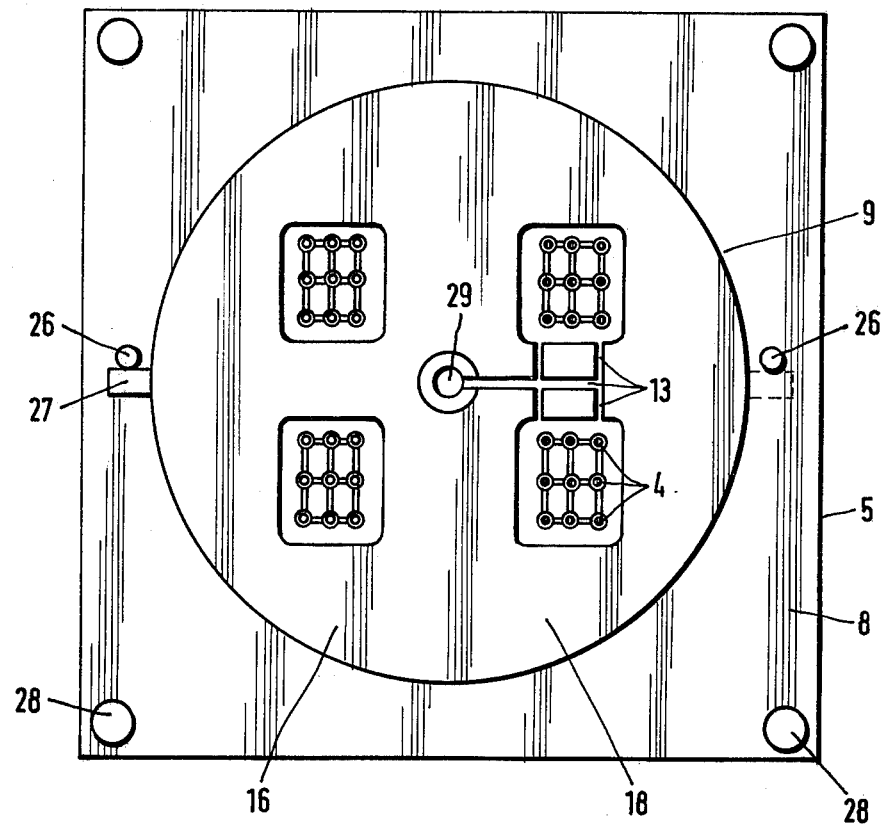
FIG. 5 shows a plan view of the lower mould part.
Figure 6:
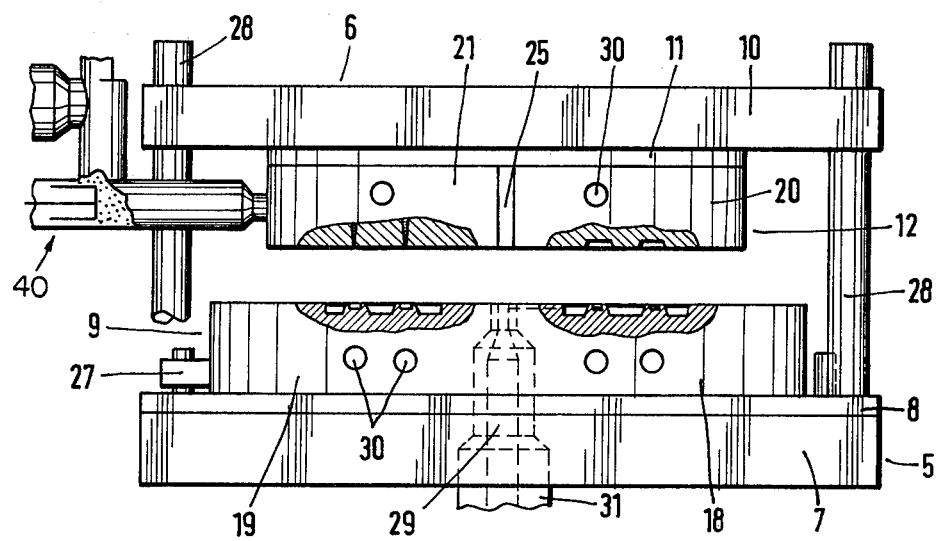
FIG. 6 shows a side view of the complete mould.
Figure 7:
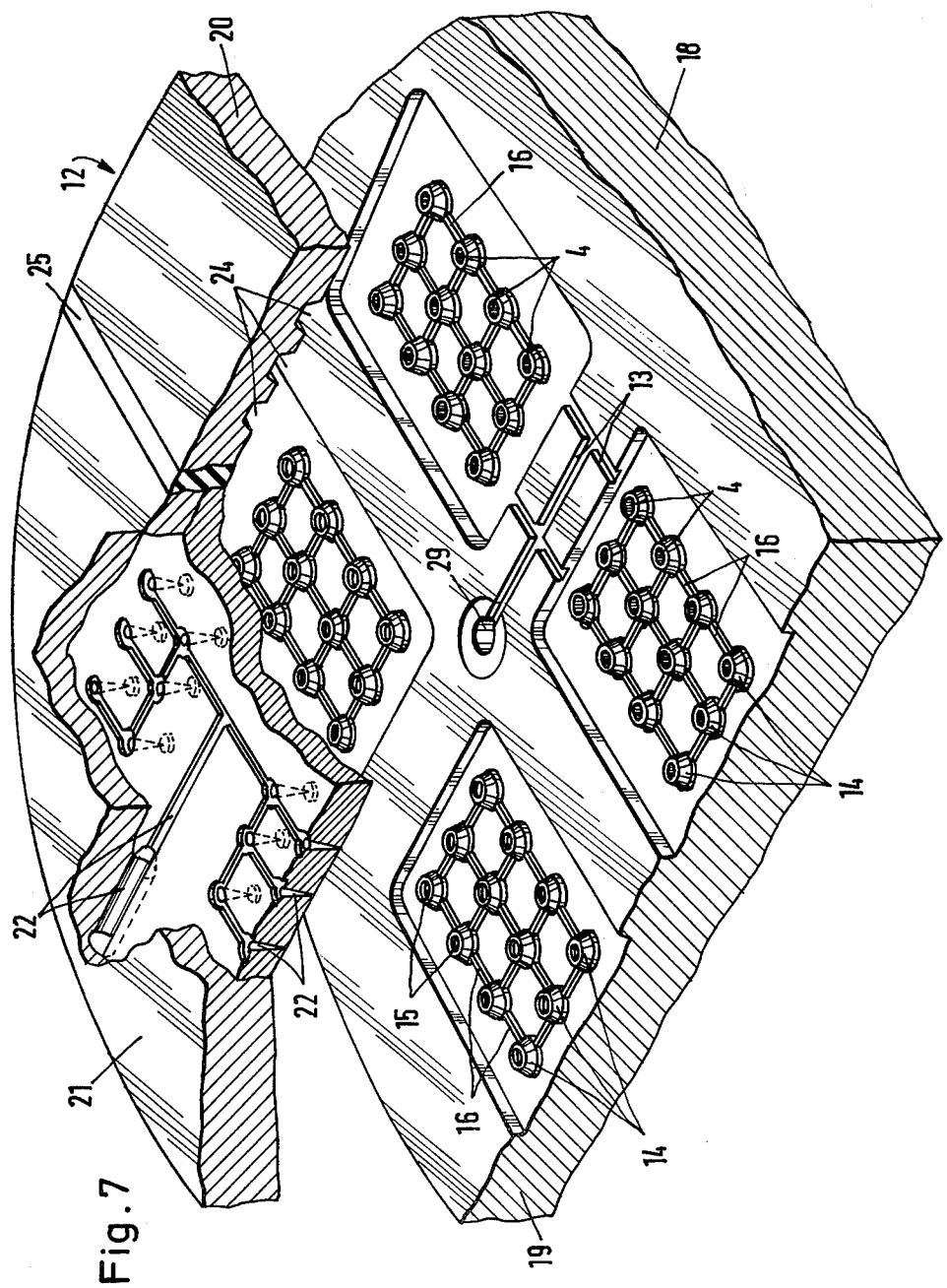
FIG. 7 shows a perspective view of the complete mould in section.

While the individual manufacturing steps are shown in principle in FIGS. 2 to 4, details of the injection mould can be seen from FIGS. 5 to 7. The injection mould consists of a lower mould part 5 and an upper mould part 6. These two are connected to one another via guide pillars 28 arranged in the corners of the rectangular mould. The two mould halves can be displaced relative to one another, sliding along these guide pillars, in order to enable the finished contact mats to be ejected from the mould by means of ejector pins or compressed air, after the two mould halves have been moved apart after the injection process. Advantageously, one mould half will be rigidly joined to the guide pillars, whilst the other mould half, as can be seen from the illustrative embodiment shown in FIG. 6, namely the upper mould part 6, is arranged to be displaceable.

FIG. 6 also shows at 40 a part of the injection-moulding machine with the extrusion barrel, the plunger, the hopper and the metering device. The lower mould part 5 is assembled from the base plate 7, a heat-insulating layer 8 or heat-insulating plate and the lower cavity plate 9. The upper mould part 6 is constructed analogously. A base plate 10 is adjoined by the heat-insulating layer 11 or plate. This is followed by the upper cavity plate 12. With respect to its temperature, this upper cavity plate 12 is divided by an insulating wall 25 into a right-hand half 20 and a left-hand half 21. Numerous orifices 30, which are intended to receive heating cartridges for heating-the die, are present in both the lower and the upper cavity plates.

As explained in more detail below, the lower cavity plate 9 can be rotated by 180 degrees relative to its base plate 7 and to the upper mould part 6. The rubber to be molded is supplied through a hollow shaft 31 which protrudes through the base plate 7 and is rotatably mounted therein. The central runner 29 is located in the interior of the hollow shaft. Runners 13 connect the central runner 29 to the mold itself. The course of runners 13 can be seen from FIG. 7. It is advantageous to select a central feed for the rotating part, in order to ensure that the difficulties to be expected with a lateral feed of the injection-moulding material are avoided. Another part of the rotating device is formed by the stop bolts 26 which are located diametrically opposite one another on the base plate 7 of the lower mould part. These stop bolts interact with a laterally protruding stop 27 on the lower cavity plate, so as to define the range of rotation.

In the illustrative embodiment which has been described and is shown in the figures, the lower cavity plate 9 is rotated about its central axis. Of course, in an analogous manner, a solution would also be conceivable in which the lower cavity plate 9 remains stationary and the upper cavity plate 12 is rotatable about the central axis. Even though these are here always called the lower and upper cavity plates, it would also be possible to insert the mould rotated by 90° into the injection-moulding machine, and these would then consistently have to be called the front and rear cavity plates. Even in this case, the two solutions already demonstrated would be conceivable. In a further solution it would be possible for the mould to consist of a front cavity plate, a middle cavity plate and a rear cavity plate, the front and the rear cavity plates executing a displacement movement, whilst the middle cavity plate undergoes a rotational movement, specifically about an axis which is accurately perpendicular to the displacement movement (in contrast thereto, the axis of rotation and the displacement lie in one and the same direction in the illustrative embodiment shown in the Figures). The mould cavities would then be located on either side of the middle cavity plate. A common feature of all these analogous illustrative embodiments which have been demonstrated and are within the scope of the invention is that one mould half is rotated relative to the other into a second position.

The manufacture of the contact mat is now described below by reference to the first illustrative embodiment.

FIG. 2 shows the first step in the method of the invention, injection-moulding of contact component 4. As already mentioned, the contact component 4 consists of a two-component HTV silicone rubber, with which electrically conductive particles have been mixed. For this purpose, the left-hand half 19 and also the right-hand half 18 of the lower cavity plate 9 have numerous raised portions 14, the circumferential contours of which determine the interior surfaces of the dome-shaped carrier portions 3 of the contact mat. On the upper side of each raised portion 14, a recess 15 is provided which is the mould for contact component 4. In the first step, the contact component 4 is then moulded by injection through the funnel-shaped runners 22. The temperature of the entire lower cavity plate 9 is above the vulcanisation temperature of the silicone rubber used here, that is to say above 180° C. The left-hand half 21 of the upper cavity plate 12 is, however, below this vulcanisation temperature, namely between 60° and 120° C., depending on the type of the silicone rubber used. The recess 15 is then filled, but not quite to the brim. When the upper mould part is moved back, the connecting ridge is torn off and a stump 32 remains. The lower mould part 5 is then swivelled by 180° up to the stop 26 (FIG. 5), so that the recesses 15, now filled with the contact components 4 reach positions opposite the cavity 24. The thickness of the contact 2 mat is fixed by the distance of the upper cavity plate from the lower cavity plate. This position is shown in FIG. 3. The composite body 2 and the carrier part 3 are then moulded by injection through runners 13 in the lower cavity plate (FIG. 4). The right-hand half of the upper cavity plate is at a temperature above the vulcanisation temperature, the whole assembly is now fully and properly vulcanised. The pressure and closing time (about 60 to 100 seconds) correspond to the usual settings.

The material selected for the contact mat (including the contacting members 4) was a two-component HTV silicone rubber which has a plastic consistency and vulcanises at about 180° C. Additionally, two-component liquid silicone rubbers (LSR) can also be used, the vulcanisation temperature of which is about 100° C. The relative temperature conditions in the mould are analogous to those of the processing of HTV silicone rubber. Incidentally, there is a wide variation in the vulcanisation temperatures of both the HTV silicone rubbers and liquid silicone rubbers.

The silicone rubber suppliers generally recommend a heat-aging (annealing) after the vulcanisation of the parts produced. However, this does not apply if materials crosslinking by addition are used. During annealing, the scission products of the crosslinking agent are removed, so that the parts become odour-free. Additionally, final crosslinking takes place which leads to an increase in the Shore hardness and a reduction of the elongation at break. The further heating makes the finished parts resistant to oil and solvents, and the annealed vulcanised products also exhibit the greatest resistance to permanent deformation caused by pressure and optimum electrical properties, which is of importance, particularly for the contact element. Moreover, silicone rubber parts are made dimensionally stable by annealing, since linear shrinkage on the order of about 1% due to the removal of volatile constituents occurs. Annealing preferably takes place in a drying cabinet with adequate circulation of air and should be carried out at least at the service temperature of the finished component, the extent of the increase in temperature depending on the thickness of the components.

We claim:

1. Process for the manufacture, by the injection-moulding process, of a contact mat which is suitable for a key board and consists of a sheet-like composite body made of an electrically non-conductive elastomeric material, comprising at least one carrier member elastically deformable upon application of pressure to a key formed therein, said carrier member being moulded in the shape of a calotte projecting out of the plane of the composite body, a respective contact component made of a vulcanizable, highly conductive material being joined to said carrier member, characterized in that the contact component is first moulded in an injection mould consisting essentially of a lower mould part and a bipartite upper mould part, the lower mould part being at a temperature above the vulcanization temperature of the contact component, one half of the upper mould part being at a temperature below the vulcanization temperature of the contact component wherein after the contact component has been fully vulcanized, the lower mould part is moved, relative to the upper mould part, from a first into a second position, and subsequently by means of runners in the lower mould part, the composite body and the carrier parts are moulded so that the contact component is rigidly joined to the carrier part, the temperatures of the lower mould part and of the other half of the upper mould part being above the vulcanization temperature of the composite body.

2. Process for the manufacture of a contact mat according to claim 1, wherein the elastomer used as the electrically nonconducting material of the composite body and the carrier parts is selected from the group consisting of silicone rubber, nitrile rubber and chloroprene rubber.

3. Process for the manufacture of a contact mat according to claim 2, characterised in that the contact component and the composite body consist of the same type of base material, which is crosslinked either by peroxides, by addition or by condensation.

4. Process for the manufacture of a contact mat according to any one of claims 1 to 3, characterised in that electrically conductive particles are additionally admixed to the base material of the contact component.

5. Process for the manufacture of a contact mat according to claim 4, characterised in that the electrically conductive particles consist of graphite, carbon black or an electrically conductive metal.

6. Process for the manufacture of a contact mat according to claim 2, characterised in that the silicone rubber is a two-component HTV (high-temperature vulcanising) silicone rubber.

7. Process for the manufacture of a contact mat according to claim 2, characterised in that the silicone rubber is a two-component liquid silicone rubber.

* * * * *

UNITED STATES PATENT AND TRADEMARK OFFICE
CERTIFICATE OF CORRECTION

PATENT NO. : 4,442,055
DATED : April 10, 1984
INVENTOR(S) : Jurgen Oelsch et al

It is certified that error appears in the above-identified patent and that said Letters Patent are hereby corrected as shown below:

Column 1, line 31, after "2,418,583" and before "a key-" insert -- discloses --.

Signed and Sealed this

Eleventh Day of September 1984

[SEAL]

Attest:

GERALD J. MOSSINGHOFF

Attesting Officer

Commissioner of Patents and Trademarks